US012607780B2

(12) United States Patent
Kim et al.

(10) Patent No.: US 12,607,780 B2
(45) Date of Patent: Apr. 21, 2026

(54) DISPLAY DEVICE

(71) Applicant: LG DISPLAY CO., LTD., Seoul (KR)

(72) Inventors: Keunyoung Kim, Paju-si (KR); HyoKyeong Son, Paju-si (KR); Nam Ki, Paju-si (KR)

(73) Assignee: LG Display Co., Ltd. (KR)

( * ) Notice: Subject to any disclaimer, the term of this patent is extended or adjusted under 35 U.S.C. 154(b) by 454 days.

(21) Appl. No.: 17/724,277

(22) Filed: Apr. 19, 2022

(65) Prior Publication Data

US 2022/0334290 A1 Oct. 20, 2022

(30) Foreign Application Priority Data

Apr. 20, 2021 (KR) ........................ 10-2021-0051399

(51) Int. Cl.
*G02B 1/14* (2015.01)
*B32B 15/00* (2006.01)
(Continued)

(52) U.S. Cl.
CPC ................ *G02B 1/14* (2015.01); *B32B 15/00* (2013.01); *B32B 17/10* (2013.01); *B32B 27/281* (2013.01); *G02B 1/11* (2013.01); *B32B 15/08* (2013.01); *B32B 15/20* (2013.01); *B32B 2307/3065* (2013.01); *B32B 2457/20* (2013.01)

(58) Field of Classification Search
CPC .. G02B 1/14; G02B 1/11; B32B 15/00; B32B 17/10; B32B 27/281; B32B 15/08; B32B 15/20; B32B 2307/3065; B32B 2457/20; B32B 17/1055; B32B 7/12; B32B 17/061; B32B 17/10036; B32B 2250/03; B32B 2250/40; C03C 27/10; C03C 17/34; C03C 2217/732; C09K 21/14; C09K 2323/057; G09F 9/35; G09F 9/301; G09F 9/33; H05K 5/0017; H05K 5/04
See application file for complete search history.

(56) References Cited

U.S. PATENT DOCUMENTS

2002/0100694 A1* 8/2002 Morin ...................... C25D 5/44 205/255
2008/0304270 A1* 12/2008 Ho ........................... F21K 9/00 362/373
(Continued)

FOREIGN PATENT DOCUMENTS

CN 104220253 A 12/2014
CN 204020138 U 12/2014
(Continued)

OTHER PUBLICATIONS

Chinese Office Action dated Apr. 15, 2024 issued in Patent Application No. 202210403496.1 w/English Translation (30 pages).
(Continued)

*Primary Examiner* — John D Freeman
(74) *Attorney, Agent, or Firm* — Fish & Richardson P.C.

(57) ABSTRACT

A display device includes a display panel and a cover window on the display panel, and the cover window includes a cover glass, a flame retardant layer, and a functional coating layer, and a cover window having a flame retardant characteristic and an anti-scattering characteristic by using a flame retardant layer is used to improve the durability and the heat-resistance of the display device.

17 Claims, 10 Drawing Sheets

500

(51) Int. Cl.

| | |
|---|---|
| ***B32B 17/10*** | (2006.01) |
| ***B32B 27/28*** | (2006.01) |
| ***G02B 1/11*** | (2015.01) |
| *B32B 15/08* | (2006.01) |
| *B32B 15/20* | (2006.01) |

(56) References Cited

U.S. PATENT DOCUMENTS

2012/0033397 A1* 2/2012 Park .................. G02F 1/133308 29/592.1
2016/0120043 A1* 4/2016 Kim ......................... B32B 5/245 361/679.01
2019/0039352 A1* 2/2019 Zhao ..................... B32B 27/306
2020/0157395 A1* 5/2020 Liu ....................... B32B 27/281
2020/0310494 A1* 10/2020 Ahn ........................ B32B 17/10

FOREIGN PATENT DOCUMENTS

CN 106200116 A 12/2016
CN 206684424 U 11/2017
CN 108282559 A 7/2018
CN 108472933 A 8/2018
CN 109192075 A 1/2019
CN 109940948 A 6/2019
CN 110767842 A 2/2020
CN 211956061 U 11/2020
CN 112209628 A 1/2021
JP 2010-126717 A 6/2010
JP 2013-249210 A 12/2013
JP 2019214159 A * 12/2019
KR 20120013064 A 2/2012
KR 10-2014-0034173 A 3/2014
KR 20160002630 U * 7/2016
KR 20170092158 A 8/2017

OTHER PUBLICATIONS

Chinese Office Action dated Nov. 17, 2023 issued in Patent Application No. 202210403496.1 Translation (17 pages).
Office Action in Korean Appln. No. 10-2021-0051339, mailed on Jan. 1, 2026, 16 pages (with English translation).

* cited by examiner

| CLASSIFICATION | EXEMPLARY EMBODIMENT 4 | EXEMPLARY EMBODIMENT 5 | EXEMPLARY EMBODIMENT 6 | EXEMPLARY EMBODIMENT 7 | COMP. EMBODIMENT 2 |
|---|---|---|---|---|---|
| BEFORE DROPPING |  |  |  |  |  |
| AFTER DROPPING (SAMPLE 1) |  |  |  |  |  |
| AFTER DROPPING (SAMPLE 2) |  |  |  |  |  |
| TEST RESULT | CRACK O SHATTERING X | CRACK O SHATTERING X | CRACK O SHATTERING X | CRACK O SHATTERING X | CRACK O SHATTERING O (SAMPLE 1) |

DISPLAY DEVICE

CROSS-REFERENCE TO RELATED APPLICATION

This application claims the priority of Korean Patent Application No. 10-2021-0051399 filed on Apr. 20, 2021, which is hereby incorporated by reference in its entirety.

BACKGROUND

Field of the Disclosure

The present disclosure relates to a display device, and more particularly to a display device with a flame retardant characteristic and an anti-scattering characteristic.

Description of the Background

As it enters the information era, a display field which visually expresses electrical information signals has been rapidly developed, and in response to this, various display devices having excellent performances such as thin-thickness, light weight, and low power consumption have been developed. Specific examples of such a display device may include a liquid crystal display device (LCD), a plasma display panel device (PDP), a field emission display device (FED), and an organic light emitting display device (OLED).

In the meantime, display devices installed in public places accessed by anyone must satisfy various regulations. For example, the display devices used in the enclosed spaces such as automobiles, subways, ships, and aircrafts require legal requirements because in the event of fire, damage to human life may occur due to the spread of flame or toxic smoke caused by the combustion.

Generally, an optical film such as a polarization film used for the outermost part of the display device is formed of polymer materials which are vulnerable to heat and fire. Accordingly, in the event of fire, the optical film is burned to spread the flame or toxic smoke, which causes the damage to life. Further, the small flame generated at the outside of the display device burns not only the outside of the display device, but also components of the display device such as a display panel therein to cause material damages to the display device and surrounding objects.

When a cover glass is used to protect the display panel, the cover glass can be cracked or damaged by the external impact and the glass fragments scatter to cause the damage to the human body.

Therefore, it is required to protect the display panel by disposing a high-strength cover window on a surface of the display panel and minimize damages by various accidents and fire which may occur in the enclosed spaces or the public places.

SUMMARY

Accordingly, the present disclosure is directed to a display device that substantially obviates one or more of problems due to limitations and disadvantages described above. More specifically, the present disclosure is to provide a display device including a cover window with a flame retardant characteristic and an anti-scattering characteristic.

The present disclosure is also to provide a display device used for a transportation means such as automobiles, subways, and aircrafts which satisfies the specifications required by domestic laws and international standards related to the fire.

Further, the present disclosure is to provide a display device which minimizes damages due to various accidents and fire which may occur in an enclosed space or a public place.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a display panel; and a cover window on the display panel, and the cover window includes a cover glass, a flame retardant layer, and a functional coating layer. A cover window having a flame retardant characteristic and an anti-scattering characteristic by using a flame retardant layer is used to improve the durability and the heat-resistance of the display device.

In another aspect of the present disclosure, a cover window having a flame retardant characteristic and an anti-scattering characteristic is disposed to improve the durability and the heat-resistance of the display device.

A plurality of thin cover glasses of the present disclosure is bonded using an adhesive layer which performs both the adhesive function and the flame retardant function to implement the thin-thickness with both excellent flame retardant characteristic and rigidity.

The display device of the present disclosure satisfies domestic laws and international standards related to the fire may be provided.

In a further aspect of the present disclosure, a display device includes a display panel; a cover glass disposed on the display panel; an adhesive layer bonding the display panel and the cover glass; at least one flame retardant layer disposed on the cover glass; and at least one a functional coating layer disposed on the at least one flame retardant layer and functioning as one or more of an anti-scattering layer, a hard coating layer, an anti-fingerprint layer, an anti-reflection layer, an anti-contamination layer, an anti-glare layer, a viewing angle control layer, and an anti-static layer.

The effects according to the present disclosure are not limited to the contents exemplified above, and more various effects are included in the present disclosure.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1A:
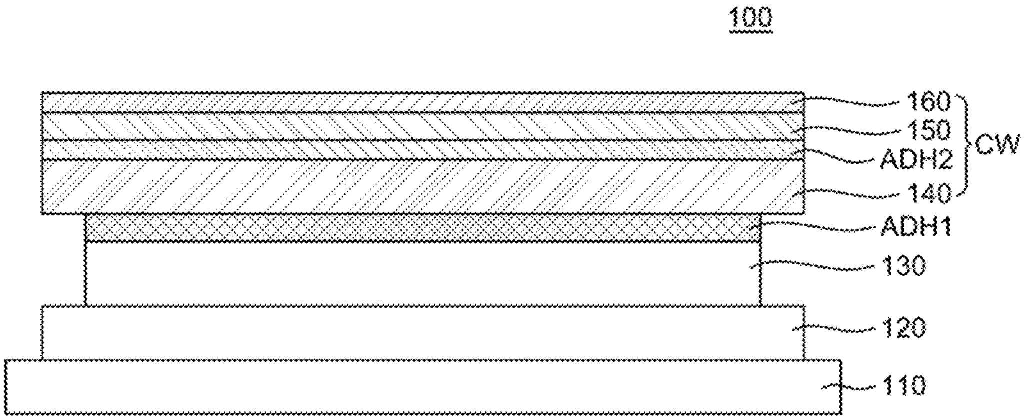
FIG. 1A is a schematic cross-sectional view of a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereinafter, a display device according to exemplary aspects of the present disclosure will be described in detail with reference to accompanying drawings.

Figure 1B:
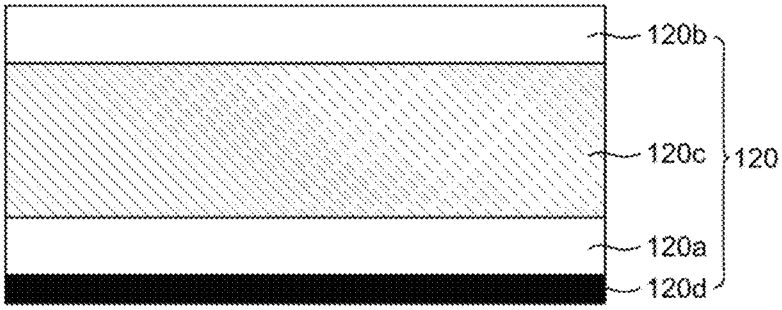
FIG. 1B is a cross-sectional view illustrating an example of a structure of a back cover of a display device according to an exemplary aspect of the present disclosure.

FIGS. 1A and 1B are views for explaining a display device according to an exemplary aspect of the present disclosure. FIG. 1A is a schematic cross-sectional view of a display device according to an exemplary aspect of the present disclosure. FIG. 1B is a cross-sectional view illustrating an example of a structure of a back cover of a display device according to an exemplary aspect of the present disclosure.

Referring to FIG. 1A, a display device 100 according to an exemplary aspect of the present disclosure includes a cover plate 110, a back cover 120, a display panel 130, a first adhesive layer ADH1, and a cover window CW. Hereinafter, individual components will be described in more detail.

First, the cover plate 110 is a case member which accommodates and protects the display panel 130 and components of the display device 100.

The cover plate 110 may be formed of a plastic having a strong strength or a metallic material to protect the display panel 130. For example, the cover plate 110 may be a metallic material such as stainless steel (SUS) or Invar and may be formed of a plastic material such as polymethyl methacrylate (PMMA), polycarbonate (PC), polyvinylalcohol (PVA), acrylonitrile butadiene-styrene (ABS), polyethylene terephthalate (PET), silicone, and polyurethane (PU), but it is not limited thereto.

The cover plate 110 may be an integrated cover plate having a rectangular frame shape having a vertically bent edge. Further, the cover plate 110 may be a separable cover plate which includes a lower plate which is located below the display panel 130 and a side plate which is disposed to enclose a side portion of the display panel 130. In the separable cover plate, the lower plate and the side plate are coupled. A more detailed shape of the cover plate 110 will be described below with reference to FIG. 5.

The back cover 120 is disposed on the cover plate 110. The back cover 120 is disposed on a rear surface of the display panel 130 to support the display panel 130 and performs a heat dissipation function to smoothly dissipate heat from the display panel 130 to the outside. The back cover 120 may include a material having a high thermal conductivity and a rigidity to perform the supporting function and the heat dissipation function. For example, the back cover 120 may be manufactured by a metal plate such as aluminum, aluminum nitride (AlN), electrolytic galvanized iron (EGI), stainless steel (SUS), galvalume (SGLC), aluminized steel sheet (ALCOSTA), and tin-plated steel sheet (SPTE), but is not limited thereto.

The back cover 120 may be formed of an advanced composite material (ACM) to ensure the rigidity and the heat dissipating characteristic. Hereinafter, the structure of the back cover 120 which is formed of an advanced composite material (ACM) will be described in more detail with reference to FIG. 1B.

Referring to FIG. 1B, the back cover 120 formed of the advanced composite material (ACM) includes a first metal layer 120*a*, a polymer layer 120*c*, and a second metal layer 120*b*. The first metal layer 120*a* and the second metal layer 120*b* may be formed of a metal material such as aluminum, aluminum nitride (AlN), electrolytic galvanized iron (EGI), stainless steel (SUS), galvalume (SGLC), aluminized steel sheet (ALCOSTA), or tin-plated steel sheet (SPTE). The polymer layer 120*c* is filled between the first metal layer 120*a* and the second metal layer 120*b* to absorb an external impact. The polymer layer 120*c* may be formed of a fiber material such as a carbon fiber, a silicon carbide fiber, and an aramid fiber, or a boron fiber or a heat-resistant resin such as an epoxy resin and a polyimide resin, but is not limited thereto.

In FIG. 1B, it is illustrated that the first metal layer 120*a* and the second metal layer 120*b* are disposed on a lower surface and an upper surface of the polymer layer 120*c*, respectively. However, the first metal layer 120*a* and the second metal layer 120*b* are disposed to completely enclose a side surface of the polymer layer 120*c* so that the polymer layer 120*c* is sealed by the first metal layer 120*a* and the second metal layer 120*b* to fill the inside.

An oxide layer 120*d* may be formed on one surface of the first metal layer 120*a*. The oxide layer 120*d* may be formed by anodizing a surface of the first metal layer 120*a* which is exposed to the outside and the other surface of a surface on which the first metal layer 120*a* and the polymer layer 120*c* are in contact. The oxide layer 120*d* may be disposed so as to be opposite to an upper surface of the cover plate 110. The oxide layer 120*d* improves the durability and the rigidity of the first metal layer 120*a*. For example, when the first metal layer 120*a* and the second metal layer 120*b* are formed of aluminum, the oxide layer 120*d* on the first metal layer 120*a* is turned into aluminum oxide. Since the aluminum oxide has a strong mechanical property and excellent chemical resistance, it protects the back cover 120.

Even though in FIG. 1B, it is illustrated that the oxide layer 120*d* is formed only on the surface of the first metal layer 120*a*, the oxide layer 120*d* may be additionally formed on the surface of the second metal layer 120*b*. When the oxide layer is formed on surfaces of the first metal layer 120*a* and the second metal layer 120*b* which are exposed to the outside, the rigidity and the durability of the back cover 120 can be significantly improved.

The back cover 120 may be attached to the display panel 130 or the cover plate 110 with an optical clear adhesive (OCA) or a pressure sensitive adhesive (PSA) or a foam tape, but is not limited thereto.

The display panel 130 is disposed on the back cover 120. The display panel 130 is a panel for displaying images to a user. The display panel 130 includes a display area and a non-display area. The display area is an area where a plurality of pixels is disposed to display images. In the display area, pixels including an emission area for displaying images and a driving circuit for driving the pixels may be disposed. The pixel may include a plurality of sub pixels. The sub pixel is a minimum unit which configures the display area and each sub pixel may be configured to emit light of a specific wavelength band. For example, each sub pixel may be configured to emit red light, green light, blue light, or white light. The non-display area is disposed so as to enclose the display area. The non-display area is an area where images are not displayed and various wiring lines, driving ICs, and printed circuit boards for driving the pixels and the driving circuits disposed in the display area are disposed. In the non-display area, various ICs such as a gate driver IC and a data driver IC may be disposed.

For example, the display panel 130 may be a liquid crystal display panel which includes a liquid crystal layer and adjusts a light transmittance of liquid crystals to display images. As another example, the display panel 130 may be an organic light emitting display panel which includes an organic light emitting layer to display images using light emitted from the organic light emitting layer. The organic light emitting display panel is a self-emitting device which does not require a separate light source, unlike the liquid crystal display panel, and is thin and has an excellent flexibility. Hereinafter, the display device according to the exemplary aspect of the present disclosure will be described with an assumption that the display panel 130 is an organic light emitting display panel, but is not limited thereto. Further, the display panel 130 may be a flexible display panel.

Specifically, the display panel 130 includes a substrate, a thin film transistor, and an organic light emitting diode.

The substrate supports various elements which configure the display panel 130. The substrate may be glass or a plastic substrate having flexibility. For example, the plastic substrate may include polyimide, polyamide imide, polyethersulfone, polyethylene terephthalate, and polycarbonate, but is not limited thereto. The plastic substrate has a relatively weak barrier characteristic against moisture or oxygen so that in order to compensate therefor, the plastic substrate may have a structure in which a plastic film and an inorganic layer are laminated. For example, the flexible substrate may have a multi-layered structure in which a first plastic film, an inorganic layer, and a second plastic film are sequentially laminated, but is not limited thereto.

A thin film transistor is disposed on the flexible substrate to drive the organic light emitting diode. The thin film transistor may be disposed in each of the plurality of pixel areas. For example, the driving thin film transistor includes a gate electrode, an active layer, a source electrode, and a drain electrode. Further, the thin film transistor may further include a gate insulating layer which insulates the gate electrode from the active layer and an interlayer insulating layer which insulates the gate electrode from the source and drain electrodes.

A planarization layer may be disposed on the thin film transistor to planarize an upper surface.

The organic light emitting diode is disposed on the planarization layer. The organic light emitting diode may include an anode, a cathode, and an organic light emitting layer disposed therebetween. In the organic light emitting diode, holes injected from the anode and electrons injected from the cathode are coupled on the organic light emitting layer to emit light. Images are displayed using the light emitted as described above.

An encapsulation layer may be disposed on the organic light emitting diode. The encapsulation layer seals the organic light emitting diode of the pixel unit. The encapsulation layer may protect the organic light emitting diode from moisture, oxygen, or impact of the outside. The encapsulation layer may be formed by alternately laminating a plurality of inorganic layers and a plurality of organic layers. For example, the inorganic layer may be formed of an inorganic material such as silicon nitride SiNx, silicon oxide SiOx, and aluminum oxide AlOx and the organic layer may use epoxy or acrylic polymer, but they are not limited thereto.

An optical control layer may be disposed on the encapsulation layer. The optical control layer uniformly transmits the light to the outside of the display panel 130 without degrading luminance of light emitted from the organic light emitting diode and reduces external light reflection to improve a display quality. For example, the optical control layer may be a polarization film.

The first adhesive layer ADH1 is disposed between the display panel 130 and the cover window CW. The display panel 130 and the cover window CW are bonded to each other by the first adhesive layer ADH1. The first adhesive layer ADH1 may be an optical clear adhesive (OCA) or an optical clear resin (OCR), but is not limited thereto.

It is advantageous that the first adhesive layer ADH1 has a high tensile strength and a shear strength compared to a general transparent adhesive. For example, the tensile strength of the first adhesive layer ADH1 may be 3 Kgf/cm2 or higher or 5 Kgf/cm2 to 20 Kgf/cm2 and the shear strength of the first adhesive layer ADH1 may be 3 Kgf/cm2 or higher or 3 Kgf/cm2 to 6 Kgf/cm2.

The cover window CW is disposed on the display panel 130 and the first adhesive layer ADH1. The cover window CW protects the display panel 130 from the external impact and scratches and suppresses the deterioration of the display element due to external air such as the moisture or oxygen. In the meantime, the display device 100 according to the exemplary aspect of the present disclosure may be used in the transportation means such as automobiles, subways, and aircrafts. As described above, when the display device is installed in the public places or densely installed in an enclosed space, the display device needs to satisfy the strict legal regulatory conditions related to the safety to protect the passengers in the case of an accident. Accordingly, the cover window CW used for the display device 100 according to the exemplary aspect of the present disclosure may have the flame retardant and anti-scattering characteristics.

The cover window includes at least one cover glass, at least one flame retardant layer, and at least one functional coating layer. Referring to FIG. 1A, in the display device 100 according to the exemplary aspect of the present disclosure, the cover window CW includes a cover glass 140, a second adhesive layer ADH2, a flame retardant layer 150, and a functional coating layer 160.

The cover glass 140 has advantages in that the optical characteristic is excellent and the strength and the impact resistance are high, and a surface hardness is excellent as compared to the cover plastic formed of transparent resin.

A thickness of the cover glass 140 may be 1 mm or lower or 0.5 mm or lower. When the display device 100 according to the exemplary aspect of the present disclosure is a flexible display device, the cover glass 140 may be a thin cover glass (TCG) having a thickness of 0.1 mm or lower, 90 μm or lower, 50 μm to 0.1 mm, 50 μm to 90 μm, or 70 μm to 90 μm. As described above, the thin cover glass having a limited thickness may effectively relieve a stress applied when the display device 100 is folded or bent.

The cover glass 140 may be a chemically strengthened glass. The chemically strengthened glass is a glass which is strengthened by a chemical strengthening method. The chemical strengthening method is a process of enhancing the strength of the glass by an ion exchange method which replaces sodium ions included in the glass with ions having an ion radius larger than that of the sodium ions. As the ions having an ion radius larger than that of the sodium ions which configure the cover glass 140 permeate, a compressive stress layer is formed on a surface of the cover glass 140 to enhance the strength. For example, the chemically strengthened glass may be prepared by a process of immersing glass in a potassium salt solution such as potassium nitride and substituting the sodium ions of the glass with potassium ions while heating at 200° C. to 450° C. for a predetermined time, but is not limited thereto. 200° C. to 450° C. is a temperature which is equal to or lower than a glass transition temperature.

The flame retardant layer 150 is disposed on the cover glass 140. When the fire occurs in the display device 100, the flame retardant layer 150 suppresses the spread of fire and generation of smoke. Additionally, when the display device 100 is broken due to the external impact, the flame retardant layer 150 may suppress the scattering of fragments.

In the display device 100 illustrated in FIG. 1A, the flame retardant layer 150 disposed on the cover glass 140 is configured by a flame retardant film. The flame retardant film may be a single-layered film formed by forming a film from a polymer material having a flame retardant characteristic or a multi-layered film in which a flame retardant coating layer including a flame retardant is formed on a base film.

First, the flame retardant film having a single-layered structure may be formed of a transparent resin. For example, the flame retardant film having a single-layered structure may be formed by one or more resins including polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS). Further, a film may be used without limitation as long as it has a flame retardant characteristic and excellent transparency.

At this time, as the flame retardant film, colorless polyimide (CPI) may be easily used. Polyimide has the excellent flame retardant characteristic and the excellent mechanical strength. Further, the polyimide has a high toughness so as to assign an anti-scattering characteristic to the flame retardant film. Further, colorless polyimide has a high light transmittance so that when the colorless polyimide is disposed on the display panel 130, it may minimize the deterioration of the luminance.

The colorless polyimide may include a unit derived from a fluorine-based aromatic diamine and a unit derived from aromatic dianhydride or include a unit derived from an aromatic diamine and a unit derived from a fluorine-based aromatic dianhydride. Further, the colorless polyimide may include a unit derived from an aromatic diamine and a unit derived from a cycloaliphatic dianhydride or include a unit derived from a cycloaliphatic diamine and a unit derived from an aromatic dianhydride.

Further, the colorless polyimide may have a polyamide imide structure further including a unit derived from an aromatic diacid dichloride.

The aromatic dianhydride may use any one or a mixture of two or more including 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy)bis(phthalic anhydride)(6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis (carboxyphenyl) dimethyl silane dianhydride (SiDA), bis (dicarboxyphenoxy) diphenyl sulfide dianhydride (BDSDA), and derivatives thereof, but is not limited thereto.

The cycloaliphatic dianhydride may use, for example, any one or a mixture of two or more including 1,2,3,4-cyclobutanetetracarboxylic dianhydride (CBDA), dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof, but is not limited thereto.

For example, the colorless polyimide may include a repeating unit represented by the following Formula 1.

[Formula 1]

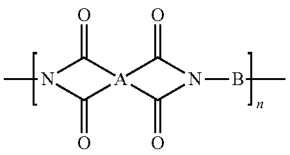

In Formula 1, A is a tetravalent organic group and is an aryl group having 6 to 42 carbon atoms or a cycloalkyl group having 4 to 30 carbon atoms, B is a divalent organic group and is an aryl group having 6 to 30 carbon atoms or a cycloalkyl group having 4 to 30 carbon atoms. n may be an integer of 10 to 1000, but is not limited thereto.

At this time, at least one of the organic groups A and B may further include a fluorine-based substituent such as trifluoromethyl (—CF3).

Next, the flame retardant film having a multi-layered structure may be configured by a base film and a flame retardant coating layer disposed on at least one surface of the base film.

The base film may be formed of a thermoplastic colorless resin. For example, the thermoplastic colorless resin may include polyimide (PI), polycarbonate (PC), polyethersulfone (PES), polyarylate (PAR), polyethylene naphthalate, polyethylene terephthalate (PET), and cycloolefin copolymer.

The flame retardant coating layer may be formed of a base resin and a flame retardant.

The base resin may be formed of polymers having transparency, for example, may include one or more of an acrylic resin, a polyester resin, a polyimide resin, a polyethylene resin, a polyurethane resin, and a polyphenylene sulfide resin, but is not limited thereto.

The flame retardant may use one or more including halogen-based flame retardants, phosphorus (P)-based flame retardants, nitrogen-based flame retardants, metal-based flame retardants, melamine-based flame retardants, antimony-based flame retardants, and graphite material-based flame retardants. To be more specific, the flame retardant may use chlorine (Cl)-based flame retardants such as chlorinated paraffin, chlorinated polyethylene, chlorinated polyphenyl, and perchloropentacyclodecane; bromine (Br)-based flame retardants such as ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, and ammonium bromide; phosphate esters or phosphorus compounds such as triallyl phosphate, alkylallyl phosphate, alkyl phosphate, dimethyl phosphonate, polyphosphate, halogenated polyphosphate ester, trimethyl phosphate, tributyl phosphate, trioctyl phosphate, tributoxyethyl phosphate, octyl diphenyl phosphate, tricredyl phosphate, credyl phenyl phosphate, triphenyl phosphate, tris(chloroethyl) phosphate, tris(2-chloropropyl) phosphate, tris(2,3-dichloropropyl) phosphate, tris(2,3-dibromo propyl) phosphate, tris (bromochloropropyl) phosphate, s (2,3-dibromopropyl)2,3-dichloropropyl phosphate, bis (chloropropyl) monooctyl phosphate, polyphosphonate, polyphosphate, aromatic polyphosphate, dibromoneopentyl glycol, and tris(diethylphosphinic acid)aluminum; polyols such as phosphonate-type polyols, phosphate-type polyols, and halogen element-containing polyols; metal powders or inorganic compounds such as aluminum hydroxide, magnesium hydroxide, magnesium carbonate, antimony trioxide, antimony trichloride, zinc borate, antimony borate, boric acid, antimony molybutene acid, molybutene oxide, a phosphorus-nitrogen compound, calcium-aluminum silicate, titanium dioxide, a zirconium compound, a tin compound, dawsonite, calcium aluminate hydrate, copper oxide, metal copper powder, calcium carbonate, and barium metaborate; or nitrogen-based flame retardants such as melamine cyanurate, triazine, isocyanurate, urea, and guanidine, but is not limited thereto.

The flame retardant may be included in an amount of 5 wt. % to 50 wt. % based on a total weight of the flame retardant coating layer, but is not limited thereto. The flame retardant may be appropriately included within a range that does not significantly deteriorate the light transmittance together with the effect of improving the flame retardant characteristic, according to the characteristic of the flame retardant to be used.

In the display device 100 according to the exemplary aspect of the present disclosure, the flame retardant layer 150 is a flame retardant film which is manufactured in advance. Accordingly, the flame retardant film is attached on an upper surface of the cover glass 140 using a separate adhesive layer to form the flame retardant layer 150. That is, a second adhesive layer ADH2 is disposed between the cover glass 140 and the flame retardant layer 150 to bond the cover glass 140 and the flame retardant layer 150 to each other. The second adhesive layer ADH2 may be an optical clear adhesive (OCA), but is not limited thereto. As long as an adhesive satisfies an adhesive characteristic and an optical characteristic, any adhesive may be used without limitation. The flame retardant layer 150 configured by the flame retardant film may be bonded onto the cover glass 140 with the second adhesive layer ADH2 therebetween by a lamination process.

The functional coating layer 160 is disposed on the flame retardant layer 150. The functional coating layer 160 may include one or more of an anti-scattering layer, a hard coating layer, an anti-fingerprint layer, an anti-reflection layer, an anti-contamination layer, an anti-glare layer, a viewing angle control layer, and an anti-static layer. The functional coating layer 160 may be disposed above, below or both above and below the cover window CW.

For example, the anti-scattering layer may be disposed on an upper surface of the flame retardant layer 150. The anti-scattering layer serves as a buffer to protect components disposed therebelow, such as the cover glass 140, from the external impact and when a damage is caused, may suppress the fragment from being shattered. For example, the anti-scattering layer may be formed of polyurethane, silicon resin, or polybutylalcohol, but is not limited thereto. For example, the anti-scattering layer may be formed by forming an anti-scattering coating agent on the cover glass 140 or the flame retardant layer 150. As another example, the anti-scattering layer may be formed by attaching an anti-scattering film on the cover glass 140 or the flame retardant layer 150.

The display device according to the exemplary aspect of the present disclosure includes a cover window including a cover glass, a flame retardant layer, and a functional coating layer. The cover window including the flame retardant layer is used to improve the flame retardant characteristic. Accordingly, when fire occurs in the display device, the spread of fire and the generation of smoke may be minimized. Further, in the display device according to the exemplary aspect of the present disclosure, the flame retardant layer of the cover window may be a flame retardant film which is manufactured in the form of a film. The previously manufactured flame retardant film is disposed on the cover glass to improve the anti-scattering characteristic. By doing this, when an external impact is applied to the cover window, the breakage may be suppressed and even though the cover window is broken, the shattering of the fragments may be minimized.

Specifically, when the display device according to the exemplary aspect of the present disclosure is installed in the public place such as automobiles, subways, and aircrafts or densely installed in an enclosed space, the display device needs to satisfy the strict legal regulation condition to solve the problem caused by the outbreak of the fire and the spreading of flame and smoke. Accordingly, the display device according to the exemplary aspect of the present disclosure uses the cover window having a flame retardant characteristic and an anti-scattering characteristic so that the display device which satisfies specifications required by the domestic laws and the international standards may be provided.

Figure 2:
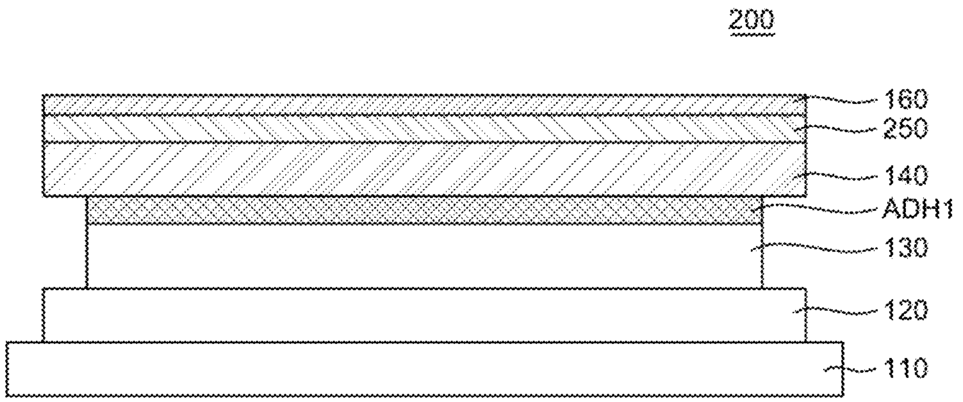
FIG. 2 is a schematic cross-sectional view of a display device according to another exemplary aspect of the present disclosure.

FIG. 2 is a schematic cross-sectional view of a display device according to another exemplary aspect of the present disclosure. Referring to FIG. 2, a display device 200 according to another exemplary aspect of the present disclosure is substantially the same as the display device 100 illustrated in FIG. 1A except that a cover window in which a flame retardant layer 250 is disposed on the cover glass 140 is provided without having a separate adhesive layer. Therefore, a description of repeated components will be omitted.

Referring to FIG. 2, the cover window includes a cover glass 140, a flame retardant layer 250, and a functional coating layer 160. At this time, the flame retardant layer 250 is configured by a flame retardant film which is disposed to be in direct contact onto the cover glass 140 without using an adhesive layer. In the display device 200 illustrated in FIG. 2, the flame retardant layer 250 is a single-layered film formed by manufacturing a film from the polymer material having a flame retardant characteristic.

First, as described with reference to FIG. 1A, the flame retardant film having a single-layered structure may be formed of a thermoplastic colorless resin. The thermoplastic colorless resin is flexible and is easily processed and has an excellent optical characteristic. For example, the flame retardant film having a single-layered structure may be formed by one or more resins including polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS). Further, the flame retardant film having a single-layered structure may be used without limitation as long as it has a flame retardant characteristic and excellent transparency.

In the display device 100 illustrated in FIG. 1A, the flame retardant film which configures the flame retardant layer 150 is formed by a separate process and then disposed on the cover glass 140 using the second adhesive layer ADH2. In contrast, in the display device 200 illustrated in FIG. 2, a flame retardant film which configures the flame retardant layer 250 is directly formed on the cover glass 140 to be disposed to be in contact with the cover glass 140.

Specifically, the flame retardant layer 250 may be formed by a method of applying a precursor composition of resin which configures the flame retardant film on the cover glass 140 and then directly forming the flame retardant film on the cover glass 140 using a polymerization reaction. For example, when the flame retardant film which configures the flame retardant layer 250 is polyimide, a polyimide precursor composition containing dianhydride and diamine is applied on the cover glass 140, and then heated at a high temperature under an inert atmosphere for thermal imidization to form the polyimide film on the cover glass 140.

Further, after preparing a resin composition by powdering and dissolving the resin which configures the flame retardant film in the organic solvent, the resin composition is applied on the cover glass 140 and then dried to form the flame retardant film. For example, when the flame retardant film which configures the flame retardant layer 250 is polyimide, after synthesizing the polyimide from the precursor first, a homogeneous reaction mixture is poured into methanol, water, or the like to precipitate polyimide and then filtering, washing, and drying processes are performed to obtain powered polyimide. A polyimide solution is prepared by dissolving the powered polyimide in an organic solvent, and then applied and dried on the cover glass 140 to form a polyimide film on the cover glass 140.

A thickness of the flame retardant layer 250 formed of the flame retardant film having a single-layered structure formed by the above-described applying process may be 20 μm or more, and may be 30 μm to 100 μm. When the thickness of the flame retardant layer 250 formed by the applying process satisfies the above-mentioned range, a sufficient flame retardant characteristic may be ensured and an upper surface may be formed to be uniform.

As illustrated in FIG. 2, when the flame retardant layer 250 is formed by the above-described applying process, the flame retardant film may be disposed on the cover glass 140 to be in direct contact thereto without using a separate adhesive layer. By doing this, not only a flame retardant characteristic is imparted to the cover window, but also the thin thickness may be implemented.

Figure 3:
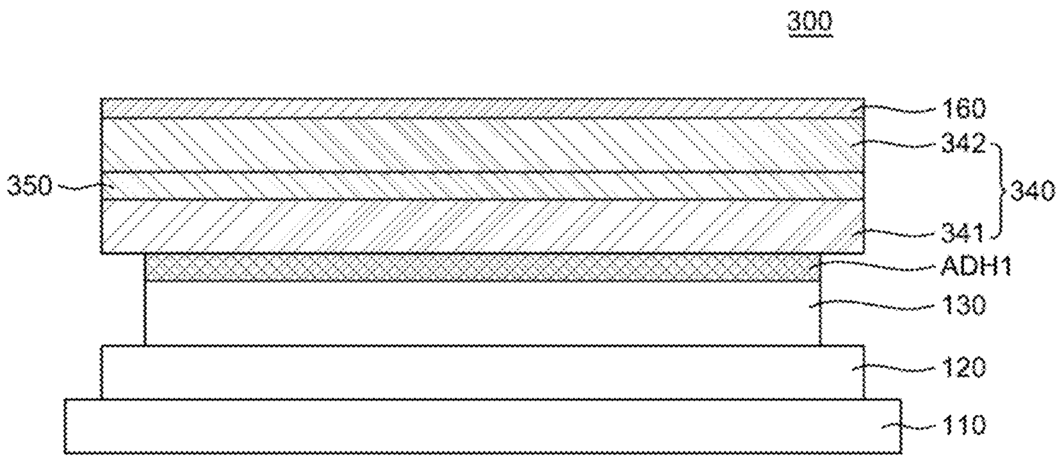
FIG. 3 is a schematic cross-sectional view of a display device according to still another exemplary aspect of the present disclosure.

FIG. 3 is a schematic cross-sectional view of a display device according to still another exemplary aspect of the present disclosure. Referring to FIG. 3, a display device 300 according to still another exemplary aspect of the present disclosure is substantially the same as the display device 100 illustrated in FIG. 1A except that a cover window which includes a plurality of cover glasses 340 and in which a flame retardant layer 350 is disposed between the plurality of cover glasses 340 is provided. Therefore, a description of repeated components will be omitted.

Referring to FIG. 3, the cover window includes a first cover glass 341, a flame retardant layer 350, a second cover glass 342, and a functional coating layer 160. The description of the first cover glass 341 and the second cover glass 342 is substantially the same as the cover glass 140 of the display device 100 illustrated in FIG. 1A, so that a redundant description will be omitted. In the display device 300 illustrated in FIG. 3, when a plurality of cover glasses 340 is provided, the rigidity of the cover window is maintained and the flexibility may be improved.

When the plurality of cover glasses 340 is configured in the cover window, a first cover glass 341 and a second cover glass 342 may be thin cover glasses (TCG). For example, thicknesses of the first cover glass 341 and the second cover glass 342 may be 0.1 mm or lower, 90 μm or lower, 50 μm to 0.1 mm, 50 μm to 90 μm, or 70 μm to 90 μm. When the display device 300 illustrated in FIG. 3 is implemented as a flexible display device, a stress applied when the flexible display device is folded or bent may be effectively relieved.

A flame retardant layer 350 is disposed between the first cover glass 341 and the second cover glass 342. In the display device 300 illustrated in FIG. 3, in the event of fire, the flame retardant layer 350 may have an adhesive characteristic which bonds the first cover glass 341 and the second cover glass 342 as well as a flame retardant characteristic which suppresses the spreading of the fire and the generation of smoke. That is, in the display device 300 illustrated in FIG. 3, the flame retardant layer 350 may also serve as an adhesive layer.

The flame retardant layer 350 may be formed from a coating composition including both the adhesive characteristic and the flame retardant characteristic.

The flame retardant layer 350 may be formed of an adhesive which satisfies the light transmittance, the adhesiveness, and the flame retardant characteristic. For example, the flame retardant layer 350 may be formed of a silicon-based optical clear adhesive, but is not limited thereto.

Further, the flame retardant layer 350 may be formed of a mixture of an adhesive and a flame retardant. The adhesive may include an adhesive selected from the known optical clear adhesive, optical clear resin, and pressure sensitive adhesive. Further, the adhesive may include a polymer resin. For example, the polymer resin may use one or more including a polyester resin, a polyimide resin, a polyethylene resin, a polyurethane resin, and a polyphenylene sulfide resin, but as long as a polymer resin satisfies a sufficient adhesiveness and light transmittance, any polymer resin may be used without limitation. The flame retardant may use one or more including a halogen-based flame retardant, a phosphorus (P)-based flame retardant, a nitrogen-based flame retardant, a metal-based flame retardant, a melamine-based flame retardant, an antimony-based flame retardant, and a graphite material-based flame retardant. The flame retardant included in the flame retardant layer 350 in the display device 300 illustrated in FIG. 3 is substantially the same as the flame retardant included in the flame retardant layer 150 of the display device 100 illustrated in FIG. 1A so that a redundant description will be omitted.

In the display device 300 according to still another exemplary aspect of the present disclosure, the cover window includes a plurality of cover glasses 340 and the flame retardant layer 350 having both the adhesiveness and the flame retardant characteristic is disposed between the plurality of cover glasses 340. The flexibility of the cover window may be improved by the plurality of cover glasses 340. Further, a separate flame retardant layer 350 can be omitted by imparting the flame retardant characteristic to the adhesive layer disposed between the plurality of cover glasses 340 so that the thickness of the cover window or the display device 300 may be reduced.

Figure 4:
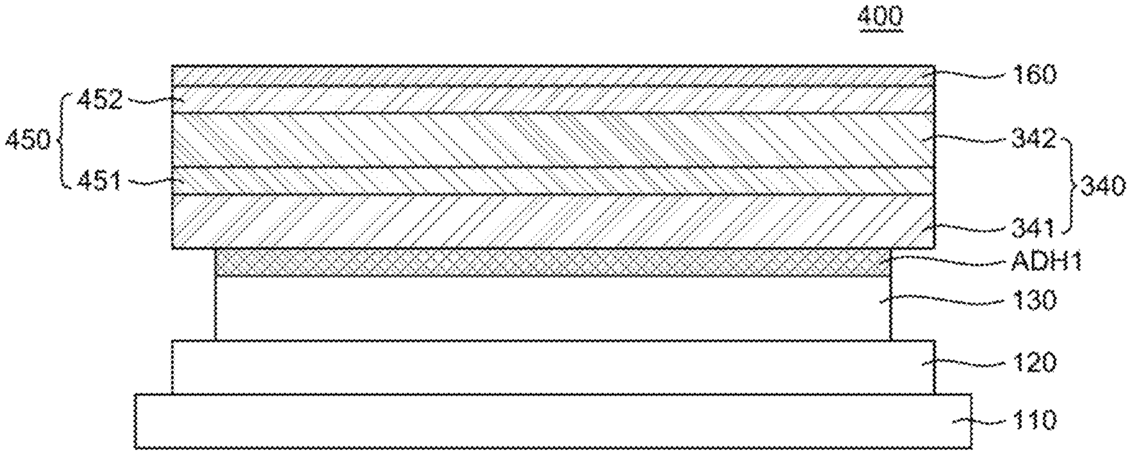
FIG. 4 is a schematic cross-sectional view of a display device according to still another exemplary aspect of the present disclosure.

FIG. 4 is a schematic cross-sectional view of a display device according to still another exemplary aspect of the present disclosure. Referring to FIG. 4, a display device 400 according to still another exemplary aspect of the present disclosure is substantially the same as the display device 300 illustrated in FIG. 3 except that a separate flame retardant layer is further disposed on the second cover glass 342. Therefore, a description of repeated components will be omitted.

Referring to FIG. 4, the cover window includes a first cover glass 341, a first flame retardant layer 451, a second cover glass 342, a second flame retardant layer 452, and a functional coating layer 160.

The first flame retardant layer 451 is disposed between the first cover glass 341 and the second cover glass 342 and has both the adhesiveness and the flame retardant characteristic. The first flame retardant layer 451 is substantially the same as the flame retardant layer 150 of the display device 100 illustrated in FIG. 1A so that a redundant description will be omitted.

The second flame retardant layer 452 is disposed on the second cover glass 342. The second flame retardant layer 452 imparts a flame retardant function and an anti-scattering function to the cover window. The second flame retardant layer 452 may be configured by a flame retardant film. The flame retardant film may be a single-layered film formed by forming a film from a polymer material having a flame retardant characteristic or a multi-layered film in which a flame retardant coating layer including a flame retardant is formed on a base film. The second flame retardant layer 452 is substantially the same as the flame retardant layer 150 of the display device 100 illustrated in FIG. 1A so that a redundant description will be omitted.

In the display device 400 according to still another exemplary aspect of the present disclosure, the cover window includes a plurality of cover glasses 340, the first flame retardant layer 451 having both the adhesiveness and the flame retardant characteristic is disposed between the plurality of cover glasses 340. Further, the second flame retardant layer 452 having the flame retardant characteristic and the anti-scattering characteristic is disposed on a surface of the cover glass 340 located at the outermost portion. The flexibility of the cover window may be improved by the plurality of cover glasses 340. Further, the flame retardant characteristic is imparted to the adhesive layer disposed between the plurality of cover glasses 340 so that the flame retardant performance of the cover window may be further improved.

Figure 5:
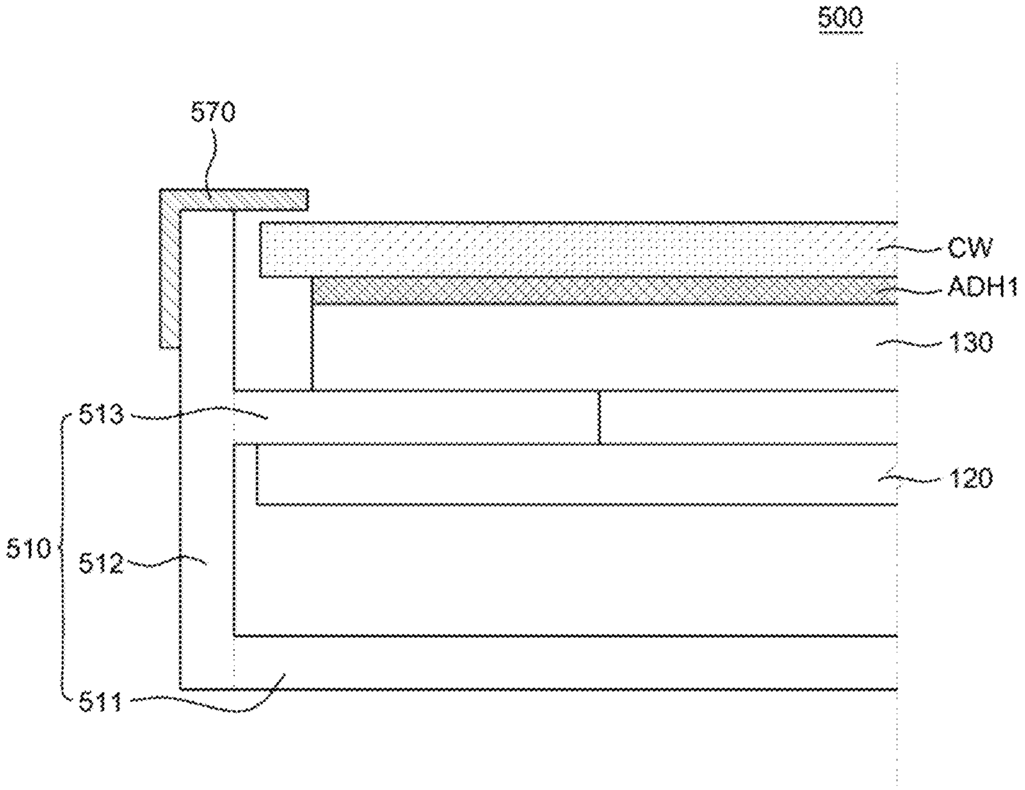
FIG. 5 is a schematic cross-sectional view of a display device according to still another exemplary aspect of the present disclosure.

FIG. 5 is a schematic cross-sectional view of a display device according to still another exemplary aspect of the present disclosure. Referring to FIG. 5, a display device 500 according to still another exemplary aspect of the present disclosure is substantially the same as the display device 100 illustrated in FIG. 1A except that the display device 500 has a structure in which a cover plate 510 includes a horizontal part 511, a vertical part 512, and a protrusion part 513 and further includes a top cover 570 which encloses an upper corner of the cover plate 510. Therefore, a description of repeated components will be omitted.

Referring to FIG. 5, the cover plate 510 protects the display panel 130 from the side surface and supports the display panel 130. The cover plate 510 includes a horizontal part 511, a vertical part 512, and a protrusion part 513.

The horizontal part 511 is disposed below the display panel 130 and the back cover 120 so as to be opposite to a rear surface of the back cover 120. The vertical part 512 extends from one end of the horizontal part 511 to a vertical direction or a front direction. That is, the vertical part 512 has a shape protruding from the horizontal part 511 to the front direction. The vertical part 512 is disposed to enclose side surfaces of the display panel 130 and the back cover 120 so as to be opposite to the side surfaces of the display panel 130 and the back cover 120. The back cover 120, the display panel 130, and the cover window CW are accommodated in an internal space provided by the horizontal part 511 and the vertical part 512.

The protrusion part 513 supports the display panel 130 therebelow. The protrusion part 513 protrudes from the vertical part 512 into the cover plate 510. The protrusion part 513 may protrude from the vertical part 512 to the inside to support the display panel 130. Specifically, the protrusion part 513 protrudes so as to be parallel to the display panel 130 between the display panel 130 and the back cover 120. The display panel 130 is disposed on an upper surface of the protrusion part 513 and the back cover 120 is disposed on a lower surface of the protrusion part 513.

In the meantime, the display panel 130 and the back cover 120 may be spaced apart from each other by the protrusion part 513 located between the display panel 130 and the back cover 120. In this case, a foam tape may be disposed into the protrusion part 513 between the display panel 130 and the back cover 120 to fill the gap between the display panel 130 and the back cover 120 and bond the display panel 130 and the back cover 120.

Even though in FIG. 5, an integrated cover plate 510 in which the horizontal part 511, the vertical part 512, and the protrusion part 513 are formed to be connected is illustrated, the horizontal part 511 and the vertical part 512 may be separated. For example, the vertical part and the protrusion part may be formed as a side plate which is fastened with a lower plate including the horizontal part.

The top cover 570 is disposed so as to enclose an upper corner of the cover plate 510. The top cover 570 protects the display panel 130 from the outside. When fire occurs at the outside of the display device 500, the top cover 570 may suppress the flame from entering between the cover window CW and the cover plate 510 to affect the display panel 130.

The top cover 570 is disposed to cover an edge of an upper surface of the cover window CW and parts of an upper surface and a side surface of the vertical part 512 of the cover plate 510. That is, the top cover 570 includes a horizontal part which covers an upper edge of the cover window CW and a vertical part which covers the side surface of the cover plate 510. The top cover 570 has a frame shape. The top cover 570 may be formed of a plastic or metal material having a high strength so as to protect the display panel 130 from physical impacts and also formed of a material having a flame retardant characteristic to protect the display panel 130 from the fire.

Figure 6:
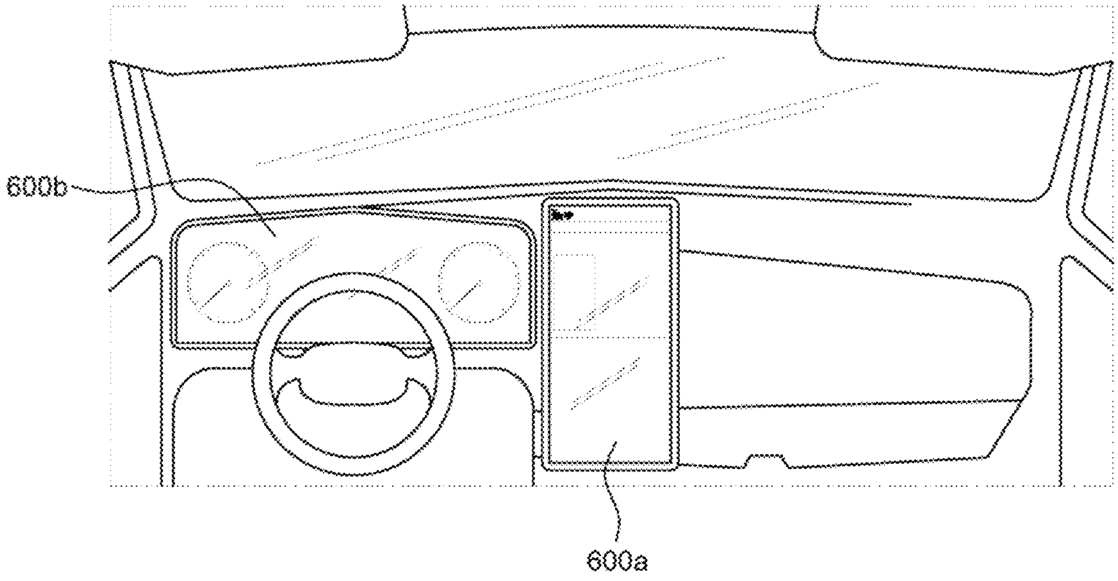
FIGS. 6 to 8 are views for explaining an example which utilizes a display device according to an exemplary aspect of the present disclosure.
Figure 7:
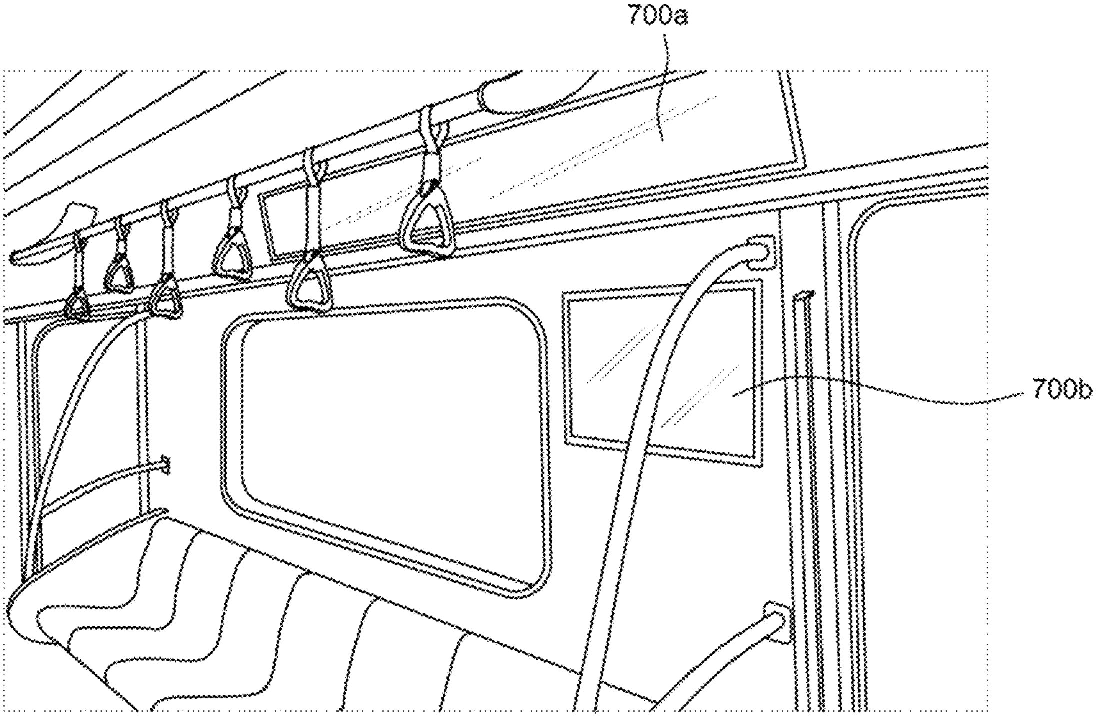
Figure 8:
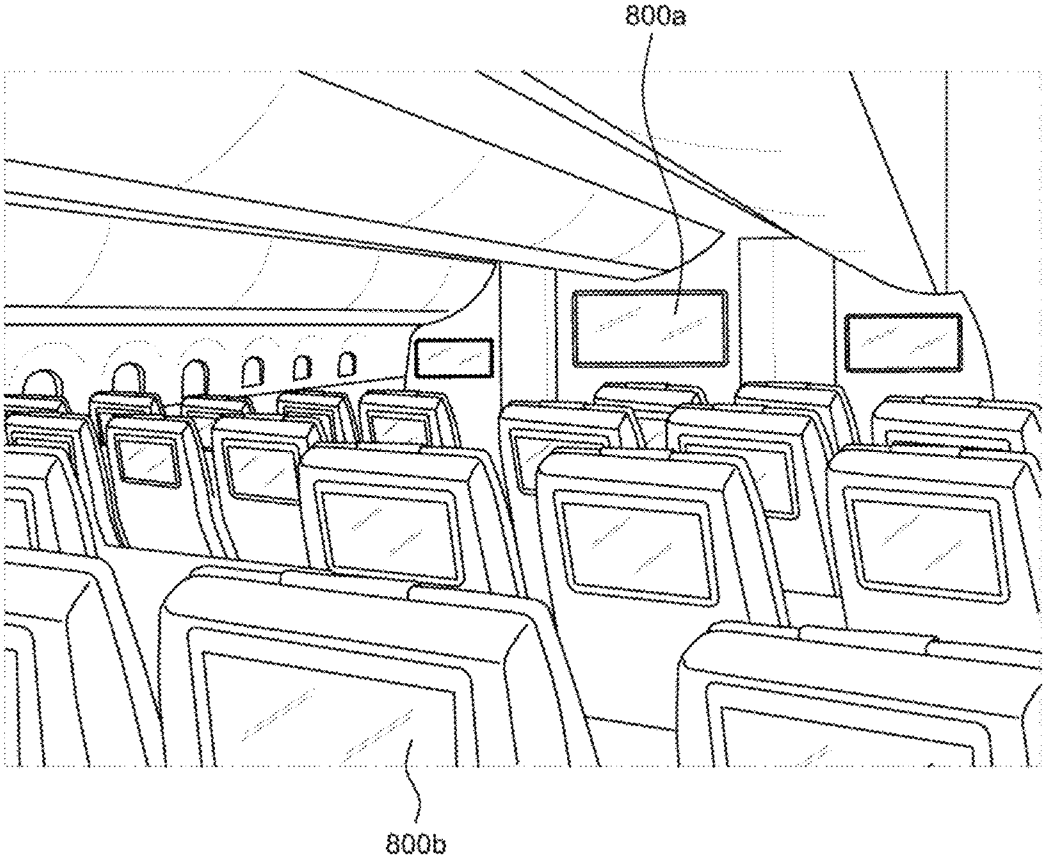

FIGS. 6 to 8 are views for explaining an example which utilizes a display device according to an exemplary aspect of the present disclosure. Referring to FIGS. 6 to 8, a display device according to an exemplary aspect of the present disclosure may be used in a transportation means such as an automobile, a subway, and an aircraft.

To be more specific, referring to FIG. 6, a display device according to an exemplary aspect of the present disclosure may be utilized as a navigation **600*a* or a dashboard 600*b* of a vehicle. Further, referring to FIG. 7, a display device according to an exemplary aspect of the present disclosure may be utilized as a signboard 700*a* or a guide infotainment 700*b* of a subway. Further, referring to FIG. 8, a display device according to an exemplary aspect of the present disclosure may be utilized as a large-size display 800*a* or a personal display 800*b*** inside an aircraft.

The transportation means such as automobiles, subways, and aircrafts are used by a large number of people in an enclosed space. Accordingly, when a display device is installed in the transportation means or an enclosed public place, a display device which satisfies various regulations needs to be used to suppress the outbreak of fire and minimize the spreading of flame and smoke. The display device according to the exemplary aspect of the present disclosure disposes a cover window including a flame retardant layer on a display panel so that the flame retardant characteristic and the anti-scattering characteristic may be improved. By doing this, a display device which satisfies the specifications required by the domestic laws and international standards may be provided.

Specifically, the display device according to the exemplary aspect of the present disclosure needs to satisfy a vertical burn specification, a smoke density specification, and a smoke toxicity specification required by the international standards.

Hereinafter, the effects of the present disclosure will be described in more detail with reference to Exemplary Aspects and Comparative Aspects. However, the following Exemplary Aspects are set forth to illustrate the present disclosure, but the scope of the disclosure is not limited thereto.

Aspect 1

A cover window in which a cover glass of 0.5 mm, an OCA of 25 μm, and a colorless polyimide film of 50 μm were sequentially laminated was prepared.

Aspect 2

A cover window was prepared by the same manner as Exemplary Aspect 1 except that a hard coating layer configured by an acrylic resin composition including silsesquioxane (SSQ) of 5 μm was additionally laminated on the colorless polyimide film.

Aspect 3

A cover window was prepared by the same manner as Exemplary Aspect 1 except that a hard coating layer configured by an acrylic resin composition of 10 μm was additionally laminated on the colorless polyimide film.

Comparative Example 1

A cover window in which a cover glass of 0.5 mm, an OCA of 25 μm, and a polarization film of 200 μm were sequentially laminated was prepared.

Experimental Example 1—Flame Retardant Characteristic Evaluation

After applying flames to the cover windows manufactured by Exemplary Aspects 1 to 3 and Comparative Aspect 1 for 60 seconds, lengths of carbonized cover windows were measured. The result was illustrated in FIG. 9.

After preparing a cover window sample (size: 2 inch×12 inch) prepared according to Exemplary Aspects 1 to 3 and Comparative Aspect 1, a front part of the sample was placed at a point 2 cm from flame having a size of 1.5 inches (a temperature is 843.3° C.) and exposed for 60 seconds to apply the flame. Thereafter, a length of the carbonized cover window was measured. The result was illustrated in FIG. 9. (When a sample burning height exceeded 6 inches, the result was a failure, when a sample burning time exceeded 15 seconds, the result was a failure, and when the sample was burned for 3 seconds or longer after the flame fell from the sample, the result was a failure.)

Figure 9:
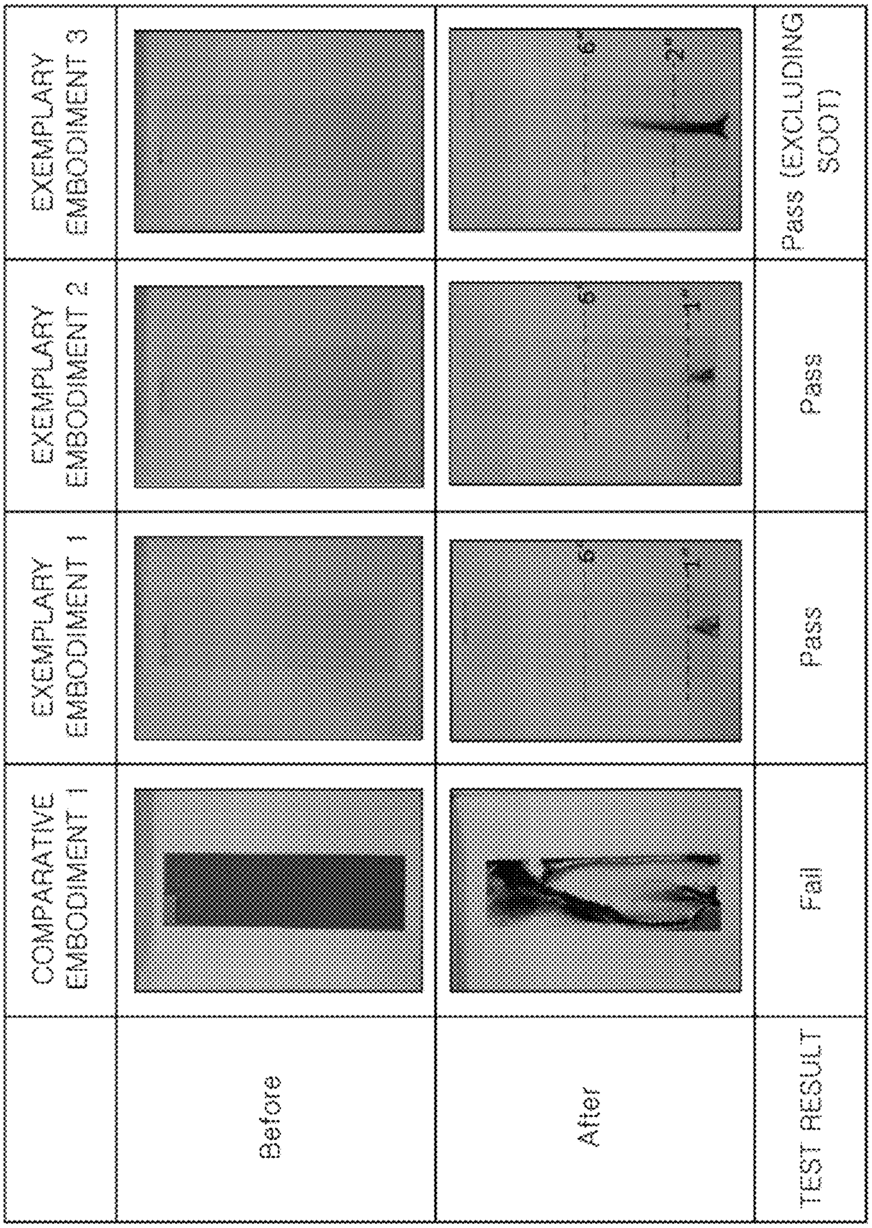
FIG. 9 is a table illustrating a flame retardant characteristic evaluation result of a cover window according to exemplary aspects and a comparative aspect.

Referring to FIG. 9, the polarization film used for the display device of the related art generally includes TAC, PVA, and acryl and is very vulnerable to heat and fire so that it is easily burned. In Comparative Aspect 1 in which the polarization film is disposed on the cover window, it is confirmed that most of the film is burned and charred. In contrast, it is confirmed that when the flame retardant layer which is formed of a colorless polyimide film is disposed on the cover glass, a length of the carbonized cover window is 2 inches or shorter. That is, it was confirmed that the flame retardant characteristic of Exemplary Aspects 1 to 3 was more excellent than that of Comparative Example 1.

Aspect 4

A cover window having a structure in which a colorless polyimide film of 28 μm was directly formed on a cover window without using an adhesive layer was prepared by a film forming process of applying a colorless polyimide composition on the cover glass of 1.0 mm and then heating.

Aspect 5

A cover window having a structure in which a colorless polyimide film of 18 μm was directly formed on a cover window without using an adhesive layer was prepared by a film forming process of applying a colorless polyimide composition on the cover glass of 0.7 mm and then heating.

Aspect 6

A cover window in which a first cover glass of 0.7 mm, an OCA of 25 μm, a second cover glass of 0.5 mm, and a colorless polyimide film of 7 μm were sequentially laminated was prepared.

Aspect 7

A cover window in which a cover glass of 1.0 mm, an OCA of 25 μm, a colorless polyimide film of 50 μm, and a hard coating layer configured by an acrylic resin composition including silsesquioxane (SSQ) of 5 μm were sequentially laminated was prepared.

Comparative Example 2

A cover window in which a first cover glass of 0.7 mm, an OCA of 25 μm, and a second cover glass of 0.5 mm were sequentially laminated was prepared.

Experimental Example 2—Impact Resistance and Anti-Scattering Characteristic Evaluation In order to identify the impact resistance and anti-scattering characteristic of the display devices of Exemplary Aspects 4 to 7 and Comparative Aspect 2, a ball drop test was conducted on a cover window by a method specified in ASTM F3007. It was checked whether cracks were caused in the cover window and whether fragments were scattered by free-falling a 260 g metal ball from a height of 2.1 M from the cover window. The result was illustrated in FIG. 10.

Figure 10:
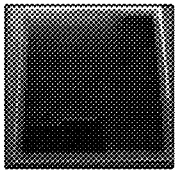
FIG. 10 is a table illustrating an impact resistance and anti-scattering characteristic evaluation result of a cover window according to exemplary aspects and a comparative aspect.
Figure 10:
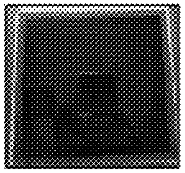
Figure 10:
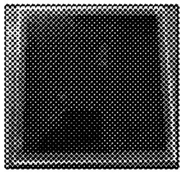
Figure 10:
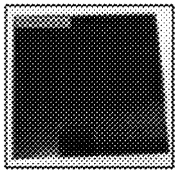
Figure 10:
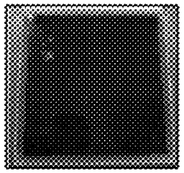
Figure 10:
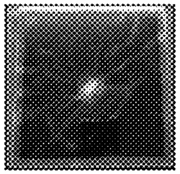
Figure 10:
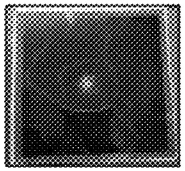
Figure 10:
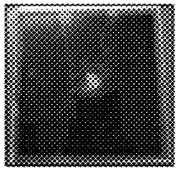
Figure 10:
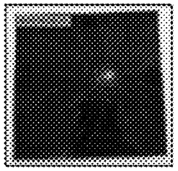
Figure 10:
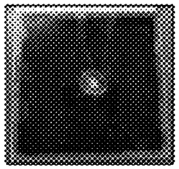
Figure 10:
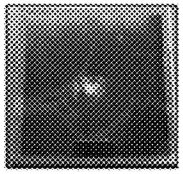
Figure 10:
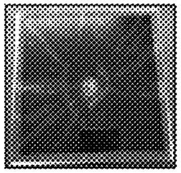
Figure 10:
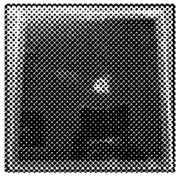
Figure 10:
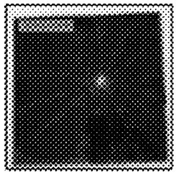
Figure 10:
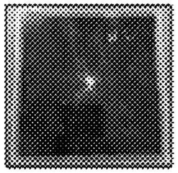

Referring to FIG. 10, when a flame retardant layer formed of a transparent polyimide film was disposed on the cover window, it was confirmed by the ball drop test that even though the cover glass was cracked, the fragments were not spattered. Further, in the case of Example 6, it was confirmed that when a cover glass double layer was used, the crack generation degree was relieved.

The exemplary aspects of the present disclosure can also be described as follows:

According to an aspect of the present disclosure, there is provided a display device. The display device comprises a display panel; and a cover window on the display panel. The cover window includes a cover glass, a flame retardant layer, and a functional coating layer.

The flame retardant layer may be a flame retardant film between the cover glass and the functional coating layer.

The flame retardant film may be a flame retardant film having a single-layered structure formed from one or more resins including polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS).

The flame retardant film may be disposed on the cover glass to be in direct contact by a coating process and a thickness of the flame retardant film may be 30 μm to 100 μm.

The flame retardant film may have a multi-layered structure including a base film and a flame retardant coating layer disposed on the base film.

The flame retardant coating layer may include a base resin and a flame retardant, the base resin may include one or more including an acrylic resin, a polyester resin, a polyimide resin, a polyethylene resin, a polyurethane resin, and a polyphenylene sulfide resin and the flame retardant may include one or more including a halogen-based flame retardant, a phosphorus (P)-based flame retardant, a nitrogen-based flame retardant, a metal-based flame retardant, a melamine-based flame retardant, an antimony-based flame retardant, and a graphite material-based flame retardant.

The flame retardant layer may include colorless polyimide.

The colorless polyimide may include a unit derived from a fluorine-based aromatic diamine and a unit derived from aromatic dianhydride, includes a unit derived from an aromatic diamine and a unit derived from a fluorine-based aromatic dianhydride, includes a unit derived from an aromatic diamine and a unit derived from a cycloaliphatic dianhydride, or includes a unit derived from a cycloaliphatic diamine and a unit derived from an aromatic dianhydride.

The cover glass may include a first cover glass and a second cover glass and the flame retardant layer may include a first flame retardant layer between the first cover glass and the second cover glass.

The first flame retardant layer may include an adhesive and a flame retardant.

The first flame retardant layer may be a silicon-based optical clear adhesive.

The display device may further comprise a second flame retardant layer on the second cover glass. The second flame retardant layer may be a flame retardant film having a single-layered structure formed from one or more resins including polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS).

The functional coating layer may be an anti-scattering layer.

The display device may further comprise a back cover below the display panel; and a cover plate enclosing side surfaces of the back cover and the display panel to accommodate the back cover and the display panel.

The back cover may include a first metal layer, a second metal layer, and a polymer layer filled between the first metal layer and the second metal layer and the polymer layer may be formed of a carbon fiber, a silicon carbide fiber, an aramid fiber, a boron fiber, an epoxy resin or a polyimide resin.

The back cover may further include an oxide layer formed on a surface of at least one of the first metal layer and the second metal layer and the oxide layer may be disposed so as to be opposite to an upper surface of the cover plate.

The first metal layer and the second metal layer may be formed of aluminum.

The cover plate may include a horizontal part below the cover so as to be opposite to a rear surface of the back cover; a vertical part protruding from the horizontal part to a front direction; and a protrusion part protruding from the vertical part to the inside to support the display panel.

The display device may further comprise a top cover which covering an upper edge of the cover window and parts of an upper surface and a side surface of the vertical part of the cover plate so as to enclose an upper corner of the cover plate.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel; and a cover window disposed on the display panel and including a cover glass, a flame retardant layer and a functional coating layer;

a back cover below the display panel to support the display panel and dissipate heat from the display panel to the outside; and a cover plate enclosing side surfaces of the back cover and the display panel to accommodate the back cover and the display panel and including a horizontal part disposed below the back cover to be opposite to a rear surface of the back cover, a vertical part protruding from the horizontal part to a front direction, and a protrusion part protruding from the vertical part to support the display panel and disposed between the display panel and the back cover, wherein the horizontal part, the vertical part and protrusion part are formed to be connected and integrated, wherein a portion between the back cover and the display panel forms a gap without other components, and wherein the back cover includes a first metal layer, a second metal layer, and a polymer layer filled between the first metal layer and the second metal layer, and the polymer layer is formed of a carbon fiber, a silicon carbide fiber, an aramid fiber, a boron fiber, an epoxy resin or a polyimide resin.

2. The display device according to claim 1, wherein the flame retardant layer includes a flame retardant film located between the cover glass and the functional coating layer.

3. The display device according to claim 2, wherein the flame retardant film includes a single-layered structure formed from one or more resins selected from the group consisting of polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS).

4. The display device according to claim 3, wherein the flame retardant film is disposed to directly contact the cover glass through a coating process and a thickness of the flame retardant film is 30 μm to 100 μm.

5. The display device according to claim 2, wherein the flame retardant film has a multi-layered structure including a base film and a flame retardant coating layer disposed on the base film.

6. The display device according to claim 5, wherein the flame retardant coating layer includes a base resin and a flame retardant, wherein the base resin includes one or more selected from the group consisting of an acrylic resin, a polyester resin, a polyimide resin, a polyethylene resin, a polyurethane resin, and a polyphenylene sulfide resin, and wherein the flame retardant includes one or more selected from the group consisting of a halogen-based flame retardant, a phosphorus (P)-based flame retardant, a nitrogen-based flame retardant, a metal-based flame retardant, a melamine-based flame retardant, an antimony-based flame retardant, and a graphite material-based flame retardant.

7. The display device according to claim 1, wherein the flame retardant layer includes colorless polyimide.

8. The display device according to claim 7, wherein the colorless polyimide includes a unit derived from a fluorine-based aromatic diamine and a unit derived from aromatic dianhydride, includes a unit derived from an aromatic diamine and a unit derived from a fluorine-based aromatic dianhydride, includes a unit derived from an aromatic diamine and a unit derived from a cycloaliphatic dianhydride, or includes a unit derived from a cycloaliphatic diamine and a unit derived from an aromatic dianhydride.

9. The display device according to claim 1, wherein the cover glass includes a first cover glass and a second cover glass and the flame retardant layer includes a first flame retardant layer between the first cover glass and the second cover glass.

10. The display device according to claim 9, wherein the first flame retardant layer includes an adhesive and a flame retardant.

11. The display device according to claim 9, wherein the first flame retardant layer includes a silicon-based optical clear adhesive.

12. The display device according to claim 9, further comprising a second flame retardant layer on the second cover glass, wherein the second flame retardant layer includes a flame retardant film having a single-layered structure formed from one or more resins selected from the group consisting of polyimide (PI), polycarbonate (PC), polyester (PE), polyethylene terephthalate (PET), polymethyl methacrylate (PMMA), polyethylene naphthalate (PEN), polyethylene sulfone (PES), acryl, and polystyrene (PS).

13. The display device according to claim 1, wherein the functional coating layer includes an anti-scattering layer.

14. The display device according to claim 1, wherein the back cover further includes an oxide layer formed on a surface of at least one of the first metal layer and the second metal layer and the oxide layer is disposed on an opposite side to an upper surface of the cover plate.

15. The display device according to claim 1, wherein the first metal layer and the second metal layer are formed of aluminum.

16. The display device according to claim 1, further comprising a top cover covering an upper edge of the cover window and parts of an upper surface and a side surface of the vertical part of the cover plate so as to enclose an upper corner of the cover plate.

17. A display device, comprising:

a display panel;

at least one cover glass disposed on the display panel;

an adhesive layer bonding the display panel and the at least one cover glass;

at least one flame retardant layer disposed on the at least one cover glass; and at least one a functional coating layer disposed on the at least one flame retardant layer and functioning as at least one of an anti-scattering layer, a hard coating layer, an anti-fingerprint layer, an anti-reflection layer, an anti-contamination layer, an anti-glare layer, a viewing angle control layer, and an anti-static layer;

a back cover below the display panel to support the display panel and dissipate heat from the display panel to the outside; and a cover plate enclosing side surfaces of the back cover and the display panel to accommodate the back cover and the display panel and including a horizontal part disposed below the back cover to be opposite to a rear surface of the back cover, a vertical part protruding from the horizontal part to a front direction, and a protrusion part protruding from the vertical part to support the display panel and disposed between the display panel and the back cover, wherein the horizontal part, the vertical part and protrusion part are formed to be connected and integrated, wherein a portion between the back cover and the display panel forms a gap without other components, and wherein the back cover includes a first metal layer, a second metal layer, and a polymer layer filled between the first metal layer and the second metal layer, and the polymer layer is formed of a carbon fiber, a silicon carbide fiber, an aramid fiber, a boron fiber, an epoxy resin or a polyimide resin.

* * * * *